US008254333B2

(12) United States Patent
Wu

(10) Patent No.: US 8,254,333 B2
(45) Date of Patent: Aug. 28, 2012

(54) METHOD FOR IMPROVING BUFFER STATUS TRIGGERING MECHANISM IN WIRELESS COMMUNICATIONS SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 417 days.

(21) Appl. No.: 12/554,928

(22) Filed: Sep. 7, 2009

(65) Prior Publication Data
US 2010/0074222 A1 Mar. 25, 2010

Related U.S. Application Data

(60) Provisional application No. 61/099,180, filed on Sep. 22, 2008.

(51) Int. Cl.
*H04W 4/00* (2009.01)
(52) U.S. Cl. ........................... 370/331; 455/436
(58) Field of Classification Search ............... 370/329, 370/331, 241; 455/436
See application file for complete search history.

(56) References Cited

U.S. PATENT DOCUMENTS

| | | | | |
|---|---|---|---|---|
| 2009/0316637 | A1* | 12/2009 | Yi et al. | 370/329 |
| 2010/0008236 | A1* | 1/2010 | Zhang et al. | 370/241 |
| 2010/0029280 | A1* | 2/2010 | Tenny et al. | 455/436 |

OTHER PUBLICATIONS

LG Electronics Inc.: "Discussion on Buffer Status Reporting Procedure", 3GPP TSG-RAN WG2 #61, R2-081084, Feb. 11-15, 2008, pp. 1-6, Sorrento, Italy, XP050138870.
Office action mailed on Nov. 29, 2011 for the European application No. 10003866.0, filing date Sep. 17, 2009, p. 1-5.
3GPP TS 36.331 v8.2.0 (May 2008), Release 8, p. 30-45.
Motorola: "MAC BSR trigger CR", 3GPP TSG-RAN2 Meeting #63, R2-084423, Aug. 18-22, 2008, XP050319489, Jeju, South Korea.
Motorola: "BSR triggering", 3GPP TSG-RAN2 Meeting #63, R2-084426, Aug. 18-22, 2008, XP050319491, Jeju, South Korea.
Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.5.0 Release 8), ETSI TS 136 300 V8.5.0 (Jul. 2008), front page + pp. 1-137, XP014042193, European Telecommunications Standards Institute (ETSI), Sophia Antipolis, France.
3GPP TS 36.321 V8.2.0 "Evolved Universal Terrestrial Radio Access (E-UTRA) Medium Access Control (MAC) protocol", May 2008.
3GPP TS 36.323 V8.2.1 "Evolved Universal Terrestrial Radio Access (E-UTRA); Packet Data Convergence Protocol (PDCP)", May 2008.
3GPP TS 36.322 V8.1.0 "Evolved Universal Terrestrial Radio Access (E-UTRA)Radio Link Control (RLC) protocol", Mar. 2008.

\* cited by examiner

*Primary Examiner* — Albert T Chou
(74) *Attorney, Agent, or Firm* — Winston Hsu; Scott Margo

(57) ABSTRACT

A method for improving a buffer status triggering mechanism for a mobile device of a wireless communication system comprises triggering a buffer status report when uplink data becomes data available for transmission and a logical channel corresponding to data of the uplink data has higher priority than logical channels corresponding to data available for transmission already existed in a transmission buffer if there is already data available for transmission other than the uplink data included in the UE transmission buffer.

38 Claims, 9 Drawing Sheets

METHOD FOR IMPROVING BUFFER STATUS TRIGGERING MECHANISM IN WIRELESS COMMUNICATIONS SYSTEM AND RELATED COMMUNICATION DEVICE

CROSS REFERENCE TO RELATED APPLICATIONS

This application claims the benefit of U.S. Provisional Application No. 61/099,180, filed on Sep. 22, 2008 and entitled "METHOD OF TRIGGERING BUFFER STATUS REPORTING IN WIRELESS COMMUNICATIONS SYSTEM AND RELATED COMMUNICATION DEVICE" the contents of which are incorporated herein.

BACKGROUND OF THE INVENTION

1. Field of the Invention

The present invention relates to a method utilized in a wireless communication and communication device thereof, and more particularly, to a method for improving a buffer status triggering mechanism in a wireless communication system and communication device thereof.

2. Description of the Prior Art

As today's applications for electronic systems grow at ever-increasing rates, the demand for better communications performance is never ceasing. Standards for various technologies such as the 3rd Generation Partnership Project (3GPP) High-Speed Packet Access (HSPA) and Long Term Evolution (LTE) work towards creating more efficient communication systems.

For example, dynamic resource allocation for uplink (UL) transmissions has been introduced in the a medium access control (MAC) layer standard, for communicating between a user equipment (UE) such as a mobile station or a mobile handset, and an Evolved Universal Terrestrial Radio Access Network (E-UTRAN) including evolved base stations (eNBs).

Dynamic resource allocation utilizes radio resources more efficiently, where radio resources are allocated only when the UE has data to transmit. The E-UTRAN schedules UE transmission based on UE buffer status. The UE buffer status reporting has a great impact on efficiency of overall radio source usage arranged by E-UTRAN. Reporting more data volume than actual data volume in the buffer makes unnecessary uplink transmission and consumes UE power. Reporting less data volume than actual data volume in the buffer makes the UE inevitably request for more resources to be allocated and wait for the uplink resource allocation, and this causes a delay before the UE data can be transmitted, slowing down the overall communication between the UE and the E-UTRAN.

In striving for faster and better communications and efficient usage of radio resource in our wireless communications systems, the unnecessary uplink resource allocation and uplink transmission delay should be alleviated.

An RRC (Radio Resource Control) connection re-establishment procedure can be initiated by the UE to re-establish the RRC connection, which involves the resumption of SRB1 (Signaling Radio Bearer 1) and the re-activation of security. The UE shall only initiate the procedure when security has been activated. The UE initiates the procedure when one of the following conditions is met: (1) a radio link failure is detected; (2) upon handover failure; (3) the maximum number of retransmissions has been reached; (4) upon integrity failure indication from lower layers; (5) upon an RRC connection reconfiguration failure.

Message exchange of the RRC connection re-establishment procedure between the UE and the EUTRAN is described below. The UE sends an RRC connection re-establishment request message to initiate the RRC connection re-establishment procedure. The EUTRAN transmits an RRC connection re-establishment message to accept the request. Finally, the UE responds with an RRC connection re-establishment complete message to notify the EUTRAN of the completion of the RRC connection re-establishment procedure.

Through the RRC connection re-establishment procedure, the SRB1 can be resumed. For resumption of other radio bearers, such as SRB2 or DRBs (data radio bearers), an RRC connection re-configuration procedure is initiated following RRC connection re-establishment procedure. The RRC connection re-configuration procedure is initiated by the EUTRAN with an RRC connection re-configuration message, and an RRC connection re-configuration complete message is sent by the UE to complete the RRC connection re-configuration procedure.

A buffer status reporting procedure is used for the UE to provide the serving eNB with information about the amount of data in the UL buffers of the UE. A Buffer Status Report (BSR) is defined as a MAC (Medium Access Control) Control Element and shall be triggered if any of the following conditions occur:

(1) UL data becomes available for transmission in the RLC entity or in the PDCP entity and the data belongs to a logical channel with higher priority than those for which data already existed in the UE transmission buffer, in which case the BSR is referred below to as "Regular BSR";

(2) UL resources are allocated and number of padding bits is equal to or larger than the size of the Buffer Status Report MAC control element, in which case the BSR is referred below to as "Padding BSR";

(3) a serving cell change occurs, in which case the BSR is referred below to as "Regular BSR"; and (4) a PERIODIC BSR TIMER expires, in which case the BSR is referred below to as "Periodic BSR".

As can be seen from the above, the BSR includes three types: Regular, Periodic and Padding types. In addition, the regular BSR is able to trigger a Scheduling Request (SR) for UL (Uplink) resources.

Furthermore, according to the buffer status reporting procedure, a PERIODIC BSR TIMER is started when the regular BSR is sent. When the PERIODIC BSR TIMER expires, the periodic BSR is sent if there is UL resources for new transmission in this TTI (Transmission Time Interval). Otherwise, the periodic BSR is not sent. In this BSR triggering behavior, the regular BSR triggering condition affects operation of the PERIODIC BSR TIMER and thus is very important. As can be seen from the above, the regular BSR can be triggered by the conditions (1) and (3). The condition (1) is used for all necessary situations other than handover, whereas the condition (3) is only applied to handover.

According to the condition (1), "the data belongs to a logical channel with higher priority than those for which data already existed in the UE transmission buffer" indicates that the UL data available for transmission needs to be compared with any data that has existed in the UE transmission buffer for logical channel priority. However, condition (1) causes an issue that no more BSR is triggered but there is still data available for transmission, which needs to be reported, in the UE transmission buffer.

In addition, "UL data becomes available for transmission in the RLC entity or in the PDCP entity" quoted from the condition (1) can cause an issue that the UL data available for transmission is reported twice, resulting in space waste of the BSR.

Four issues are described below with the current BSR triggering mechanism.

Issue 1 is described here. A UE RLC AM (Acknowledged Mode) entity associated with a logical channel receives a SDU (Service Data Unit) for transmission. Since the SDU for UL becomes available for transmission, a regular BSR is triggered according the abovementioned condition (1). Assume that no UL resources are allocated for new transmission for a TTI where the regular BSR is triggered. As a consequence, an SR is triggered and then sent. The eNB receives the SR and allocates a UL grant providing sufficient UL resources for SDU transmission. The UE receives the UL grant. The UE RLC AM entity constructs an RLC data PDU including this SDU. A poll bit is set in the RLC data PDU to request the eNB for ACK/NACK reporting, and thereby a POLL RETRANSMIT TIMER is started. The UE RLC AM entity submits the RLC data PDU to the MAC layer. The UE MAC constructs a MAC PDU including the RLC data PDU, also seen as a MAC SDU, and requests a PHY (Physical) layer to transmit. The MAC PDU transmission is failed. After a while, the POLL RETRANSMIT TIMER expires, indicating that the RLC data PDU in the transmission buffer needs to be retransmitted. However, according to the condition (1), no BSR is triggered because the RLC data PDU is already in the UE transmission buffer and furthermore, the RLC data PDU impossibly has higher priority than itself. As a result, the uplink data transmission is blocked since no BSR is triggered for the opportunity of UL resource allocating request (i.e. the SR).

Issue 2 is described here. A UE RLC AM entity associated with a logical channel X receives a SDU for transmission. According the condition (1), a regular BSR is triggered. When no UL resources allocated for new transmission for a TTI where the regular BSR is triggered, an SR is sent. The eNB receives the SR and thereby allocates a UL grant providing sufficient resources for SDU transmission with segmentation. After receiving the UL grant, the UE RLC AM entity constructs an RLC data PDU including this SDU. In addition, a poll bit is set in the RLC data PDU, and a POLL RETRANSMIT TIMER is started. The UE RLC AM entity submits the RLC data PDU to the MAC layer. The UE MAC constructs a MAC PDU and requests the PHY layer to transmit. Unfortunately the MAC PDU transmission is failed. Before the POLL RETRANSMIT TIMER expires, another UE RLC AM entity associated with a logical channel Y receives a SDU for transmission. Priority of the logical channel Y is lower than priority of the logical channel X. According to the condition (1), no BSR is triggered for the SDU of the logical channel Y because the RLC data PDU of the logical channel X has already been in the transmission buffer and the logical channel Y priority has lower priority than the logical channel X. As a result, the uplink data transmission for the SDU of the logical channel Y is blocked.

Issue 3 is described here. A DRB (Data Radio Bearer) is configured with the PDCP entity and the RLC entity to transmit IP (Internet Protocol) packets. Assume that a PDCP buffer and an RLC buffer are both empty. The PDCP entity receives an IP packet (i.e. a PDCP SDU) from an IP layer. In this situation, the condition (1) is met because the PDCP data becomes available for transmission. As a result, a regular BSR is triggered. Assuming that UL resources are available, the MAC layer sends the regular BSR immediately. After header compression and ciphering of the PDCP SDU, the PDCP entity generates a PDCP PDU and submits the PDCP PDU to the RLC entity. In this situation, the condition (1) is met again because the RLC data becomes available for transmission. Thus, another regular BSR is triggered. Assuming that UL resources are available, the MAC layer sends a regular BSR again. As can be seen from the above, the regular BSR is triggered and sent twice for the same IP data, one time for the PDPC layer and the other time for the RLC layer. This increases overhead due to an unnecessary buffer status reporting.

Issue 4 is described here. A UE has two logical channels, one for SRB1 and the other for a DRB, and initiates an RRC connection re-establishment procedure due to a radio link failure. When the UE receives an RRC connection re-establishment message, the UE shall send an RRC connection re-establishment complete message corresponding to SRB1. The UE has no UL grant to transmit the RRC connection re-establishment complete message, and the logical channel priority of SRB1 is lower than or equal to the logical channel priority of the DRB. Besides, the PDCP buffer includes data of the DRB that has been transmitted by RLC before but has not been acknowledged or negatively acknowledged before the radio link failure. In this case, no BSR is triggered according to the condition (1). As a result, the RRC connection re-establishment complete message cannot be transmitted. This causes failure of the RRC connection re-establishment procedure.

Issue 5 is described here. At RRC connection re-establishment triggered by a radio link failure, SRB 1 is resumed by an RRC connection re-establishment procedure, and other radio bearers, such as SRB2 and DRBs, are resumed by a following RRC connection reconfiguration procedure. If a regular BSR is triggered before any available radio bearers other than SRB 1 are resumed, the regular BSR includes data available for transmission for all available radio bearers including SRB1 when the PDCP buffer includes data available for transmission related to the available radio bearers. However, it may be useless to provide buffer status of the radio bearers other than SRB1 with the regular BSR since the radio bearers are still suspended. The resources, which are allocated by the eNB for the suspended radio bearers, are wasted. Furthermore, in certain situations (e.g. a session ended by an application), some of the suspended radio bearers are possibly released by the following RRC connection reconfiguration procedure instead of being resumed. In this case, it is useless to include buffer status for the released radio bearers in the regular BSR.

SUMMARY OF THE INVENTION

The present invention provides a method for improving a buffer status triggering mechanism in a wireless communication system and related communication device to solve the abovementioned problems.

According to an embodiment of the present invention, a method for improving a buffer status triggering mechanism of a communications layer for a mobile device of a wireless communication system includes receiving an indication indicating that uplink data becomes data available for transmission in an upper layer of the communications layer, when data available for transmission other than the uplink data is included in a transmission buffer of the upper layer, determining whether a logical channel corresponding to any data of the uplink data has higher priority than logical channels corresponding to the data available for transmission in the transmission buffer, and when the logical channel corresponding to any data of the uplink data has higher priority than the logical channels corresponding to the data available for transmission in the transmission buffer, triggering a buffer status report.

According to an embodiment of the present invention, a communication device of a wireless communication system for improving a buffer status triggering mechanism of a communications layer is further disclosed. The communication device includes a computer readable recording medium, a processor, a communication interfacing unit and a control unit. The computer readable recording medium is used for storing the storage data comprising program code corresponding to a process. The processor is coupled to the computer readable recording medium and used for processing storage data to execute the process. The communication interfacing unit is used for exchanging signals with a peer communication device of the wireless communication system. The control unit is coupled to the processor and communication interfacing unit and used for controlling the communication interfacing unit and the communication device according to processing results of the processor. The process includes receiving an indication indicating that uplink data becomes data available for transmission in an upper layer of the communications layer, when data available for transmission other than the uplink data is included in a transmission buffer of the upper layer, determining whether a logical channel corresponding to any data of the uplink data has higher priority than logical channels corresponding to the data available for transmission in the transmission buffer, and when the logical channel corresponding to any data of the uplink data has higher priority than the logical channels corresponding to the data available for transmission in the transmission buffer, triggering a buffer status report.

According to an embodiment of the present invention, a method for improving a buffer status triggering mechanism for a mobile device triggering a buffer status report in a wireless communication system, the method includes triggering a scheduling request corresponding to the buffer status report when the mobile device has no uplink resources allocated for a new transmission and has uplink data becoming data available for transmission.

According to an embodiment of the present invention, a communication device of a wireless communication system for improving a buffer status triggering mechanism where a buffer status report is triggered is further disclosed. The communication device includes a computer readable recording medium, a processor, a communication interfacing unit and a control unit. The computer readable recording medium is used for storing the storage data comprising program code corresponding to a process. The processor is coupled to the computer readable recording medium and used for processing storage data to execute the process. The communication interfacing unit is used for exchanging signals with a peer communication device of the wireless communication system. The control unit is coupled to the processor and communication interfacing unit and used for controlling the communication interfacing unit and the communication device according to processing results of the processor. The process includes triggering a scheduling request corresponding to the buffer status report when the communication device has no uplink resources allocated for a new transmission and has uplink data becoming data available for transmission.

According to an embodiment of the present invention, a method for improving a buffer status triggering mechanism for a mobile device of a wireless communication system includes triggering a buffer status report corresponding to a packet of a first communications layer when the packet of the first communications layer becomes data available for transmission in the first communications layer, when the packet of the first communications layer is transmitted to a second communications layer, determining whether a buffer of the second communications layer includes data whose priority is higher than the packet of the first communications layer, and when the buffer of the second communications layer does not include any data whose priority is higher than the packet of the first communications layer, determining that the packet of the first communications layer is not data available for transmission in the second communications layer.

According to an embodiment of the present invention, a communication device of a wireless communication system for improving a buffer status triggering mechanism where a buffer status report is triggered is further disclosed. The communication device includes a computer readable recording medium, a processor, a communication interfacing unit and a control unit. The computer readable recording medium is used for storing the storage data comprising program code corresponding to a process. The processor is coupled to the computer readable recording medium and used for processing storage data to execute the process. The communication interfacing unit is used for exchanging signals with a peer communication device of the wireless communication system. The control unit is coupled to the processor and communication interfacing unit and used for controlling the communication interfacing unit and the communication device according to processing results of the processor. The process includes triggering a buffer status report corresponding to a packet of a first communications layer when the packet of the first communications layer becomes data available for transmission in the first communications layer, when the packet of the first communications layer is transmitted to a second communications layer, determining whether a buffer of the second communications layer includes data whose priority is higher than the packet of the first communications layer, and when the buffer of the second communications layer does not include any data whose priority is higher than the packet of the first communications layer, determining that the packet of the first communications layer is not data available for transmission in the second communications layer.

According to an embodiment of the present invention, a method for improving a buffer status triggering mechanism for a mobile device of a wireless communication system includes initiating an RRC connection re-establishment procedure, and when an RRC connection re-establishment complete message of the RRC connection re-establishment procedure needs to be transmitted, triggering a buffer status report corresponding to the RRC connection re-establishment complete message.

According to an embodiment of the present invention, a communication device of a wireless communication system for improving a buffer status triggering mechanism where a buffer status report is triggered is further disclosed. The communication device includes a computer readable recording medium, a processor, a communication interfacing unit and a control unit. The computer readable recording medium is used for storing the storage data comprising program code corresponding to a process. The processor is coupled to the computer readable recording medium and used for processing storage data to execute the process. The communication interfacing unit is used for exchanging signals with a peer communication device of the wireless communication system. The control unit is coupled to the processor and communication interfacing unit and used for controlling the communication interfacing unit and the communication device according to processing results of the processor. The process includes initiating an RRC connection re-establishment procedure, and when an RRC connection re-establishment complete message of the RRC connection re-establishment procedure needs to be transmitted, triggering a buffer status report corresponding to the RRC connection re-establishment complete message.

According to an embodiment of the present invention, a method for improving a buffer status triggering mechanism for a mobile device of a wireless communication system includes triggering a buffer status report for radio bearers other than a signaling radio bearer 1 after the radio bearers other than the signaling radio bearer 1 are resumed.

According to an embodiment of the present invention, a communication device of a wireless communication system for improving a buffer status triggering mechanism where a buffer status report is triggered is further disclosed. The communication device includes a computer readable recording medium, a processor, a communication interfacing unit and a control unit. The computer readable recording medium is used for storing the storage data comprising program code corresponding to a process. The processor is coupled to the computer readable recording medium and used for processing storage data to execute the process. The communication interfacing unit is used for exchanging signals with a peer communication device of the wireless communication system. The control unit is coupled to the processor and communication interfacing unit and used for controlling the communication interfacing unit and the communication device according to processing results of the processor. The process includes triggering a buffer status report for radio bearers other than a signaling radio bearer 1 after the radio bearers other than the signaling radio bearer 1 are resumed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
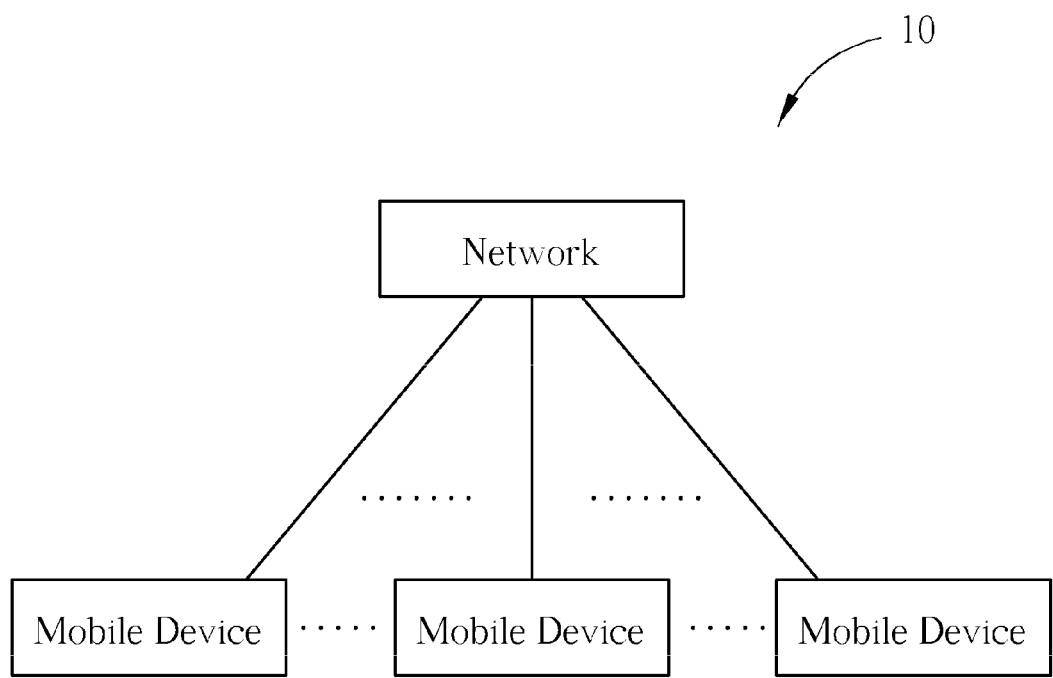
FIG. 1 is a schematic diagram of a wireless communication system.

Please refer to FIG. 1, which illustrates a schematic diagram of a wireless communication system 10 according to an embodiment of the present invention. The wireless communication system 10 is briefly composed of a network and a plurality of mobile devices. In FIG. 1, the network and the mobile devices are simply utilized for illustrating the structure of the wireless communication system 10. Preferably, the wireless communication system 10 is an LTE (long-term evolution) system. In the LTE system, the network is referred as an evolved base station (eNB) or a EUTRAN (evolved-UTAN) comprising a plurality of eNBs, whereas the mobile devices are referred as user equipments (UEs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink, the network is the transmitter and the UE is the receiver.

Figure 2:
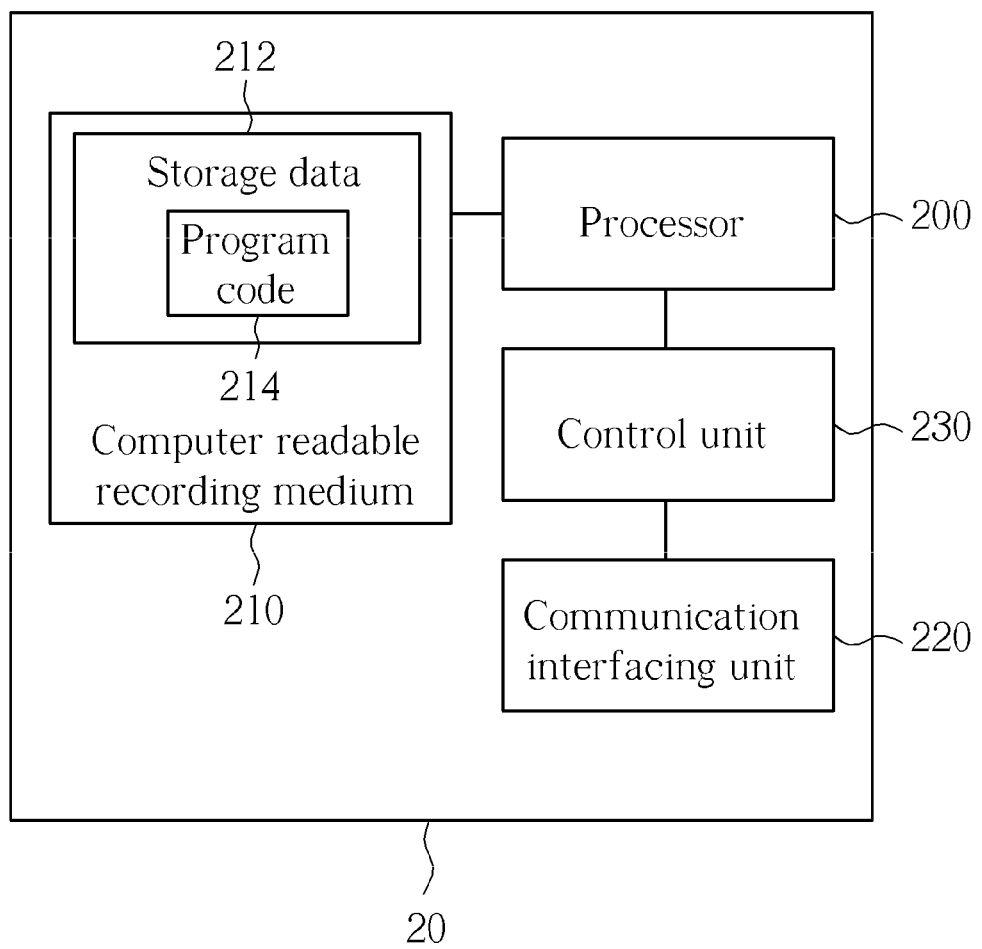
FIG. 2 is a schematic diagram of a communication device according to embodiments of the present invention.

Please refer to FIG. 2, which illustrates a schematic diagram of a communication device 20 according to an embodiment of the present invention. The communication device 20 can be the mobile devices (UEs in the LTE system) shown in FIG. 1 and includes a processor 200, a computer readable recording medium 210, a communication interfacing unit 220 and a control unit 230. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processing results of the process 200. The communication interfacing unit 220 is preferably a radio transceiver for wirelessly communicating with the network.

Figure 3:
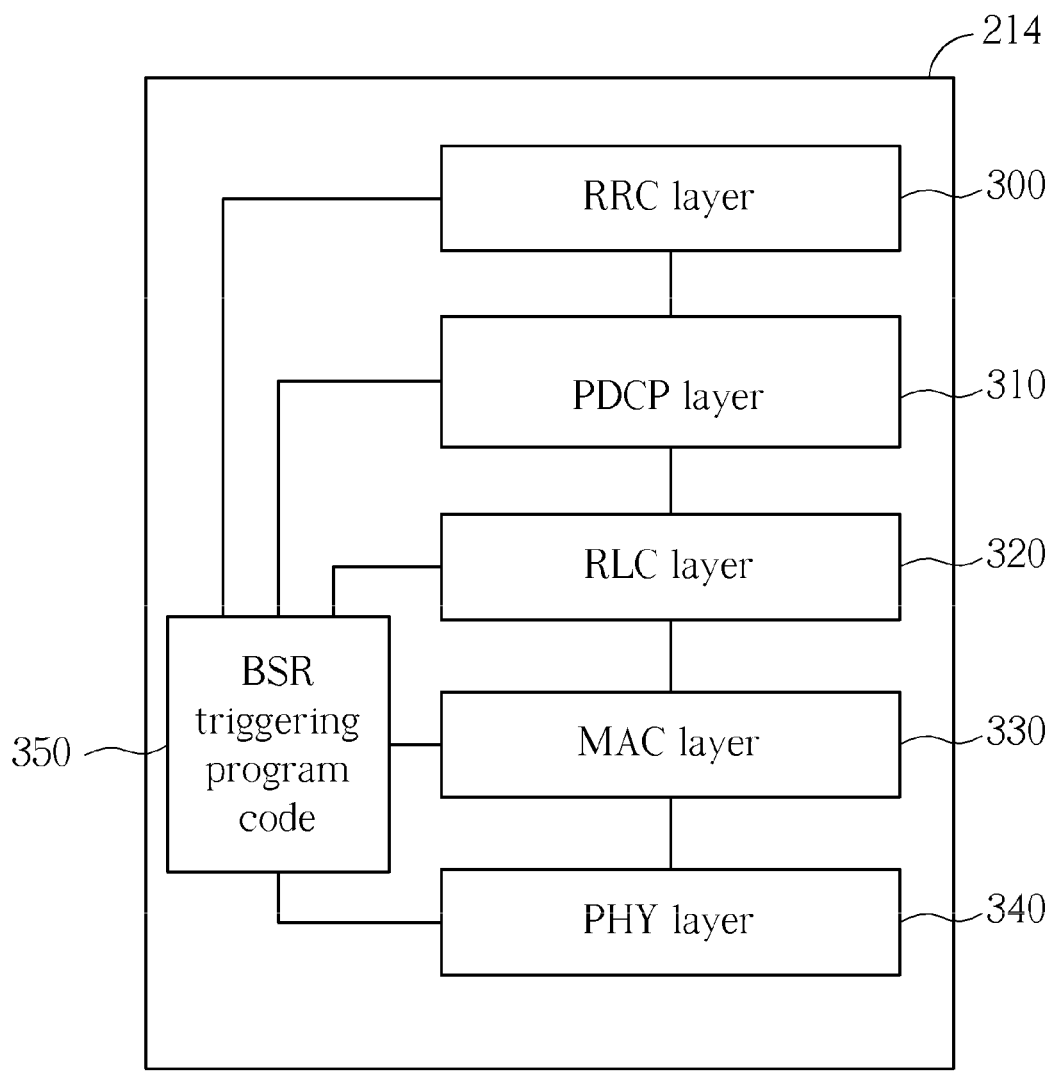
FIG. 3 is a schematic diagram of the program code according to FIG. 2.

Please refer to FIG. 3, which illustrates a schematic diagram of the program code 214 for the LTE system according to an embodiment of the present invention. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. The RRC layer 300 and the RLC layer 320 can establish an RRC connection and an RLC link with the network. According to the communication quality requirement and configuration indicated by the network, the RRC layer 300 is used for performing RRC connection establishment, re-establishment, reconfiguration, or other RRC procedures. The RRC layer 300 is responsible for generating or releasing radio bearers (RBs) including data RBs (DRBs) and signaling RBs (SRBs). SRB data has higher, equal or lower priority than DRB data depended on system requirement.

The RLC layer 320 is used for performing RLC reset or RLC re-establishment. Furthermore, the RLC layer 320 is able to process RLC SDUs (Service Data Units), RLC data PDUs (Protocol Data Units), RLC control PDUs, STATUS PDUs including ACKs (Acknowledgements) or NACKs (Negative Acknowledgements), or segments of the foregoing RLC PDUs.

The MAC layer 330 is used for triggering and transmitting a buffer status report (BSR) including buffer states of the RLC layer 320 and the PDCP layer 310. The BSR includes three types: Regular, Periodic and Padding types. Data that shall be included in the buffer status report is hereinafter called data available for transmission including the following types.

For the RLC layer 320, the following data is considered the data available for transmission:

RLC SDUs (Service Data Units), or segments thereof, that have not yet been included in an RLC data PDU or RLC data PDUs, or portions thereof, that are pending for retransmission in an AM (Acknowledged Mode); and a STATUS PDU that attempts to be transmitted in the next transmission opportunity, if the STATUS PDU has been triggered and a status prohibit timer is not running or has expired.

Please note that the RLC SDUs pending for retransmission herein mean that data of the RLC SDUs are used in a following retransmission. Preferably, the RLC SDUs are still retransmitted in RLC PDU or RLC PDU segment form.

For the PDCP layer 310 without occurrence of a handover, the following data is considered the data available for transmission:

the PDCP SDUs for which no PDCP PDU has been submitted to lower layers.

More specifically, the data available for transmission includes:

the abovementioned PDCP SDUs, if the PDCP SDU has not yet been processed by the PDCP layer 310, or a PDCP control or data PDU if the PDCP SDU has been processed by the PDCP layer 310.

In addition, for radio bearers mapped on the AM of the RLC layer 320, if the PDCP layer 310 has previously received an indication indicating that a handover or a RRC connection re-establishment has occurred, the following data is considered the data available for transmission for the PDCP layer 310:

For PDCP SDUs for which a corresponding PDU has only been submitted to lower layers before the PDCP layer 310 has received an indication that a handover or a RRC connection re-establishment has occurred, and for which the successful delivery has not been confirmed by lower layers (e.g. the RLC layer 320) or by a PDCP status report.

More specifically, the data available for transmission includes:

the PDCP SDU that has not yet been processed by the PDCP layer 310, or the PDCP data PDU that once has been processed by the PDCP layer 310.

All data available for transmission for BSRs in the following processes are defined as the abovementioned data available for transmission.

Figure 4:
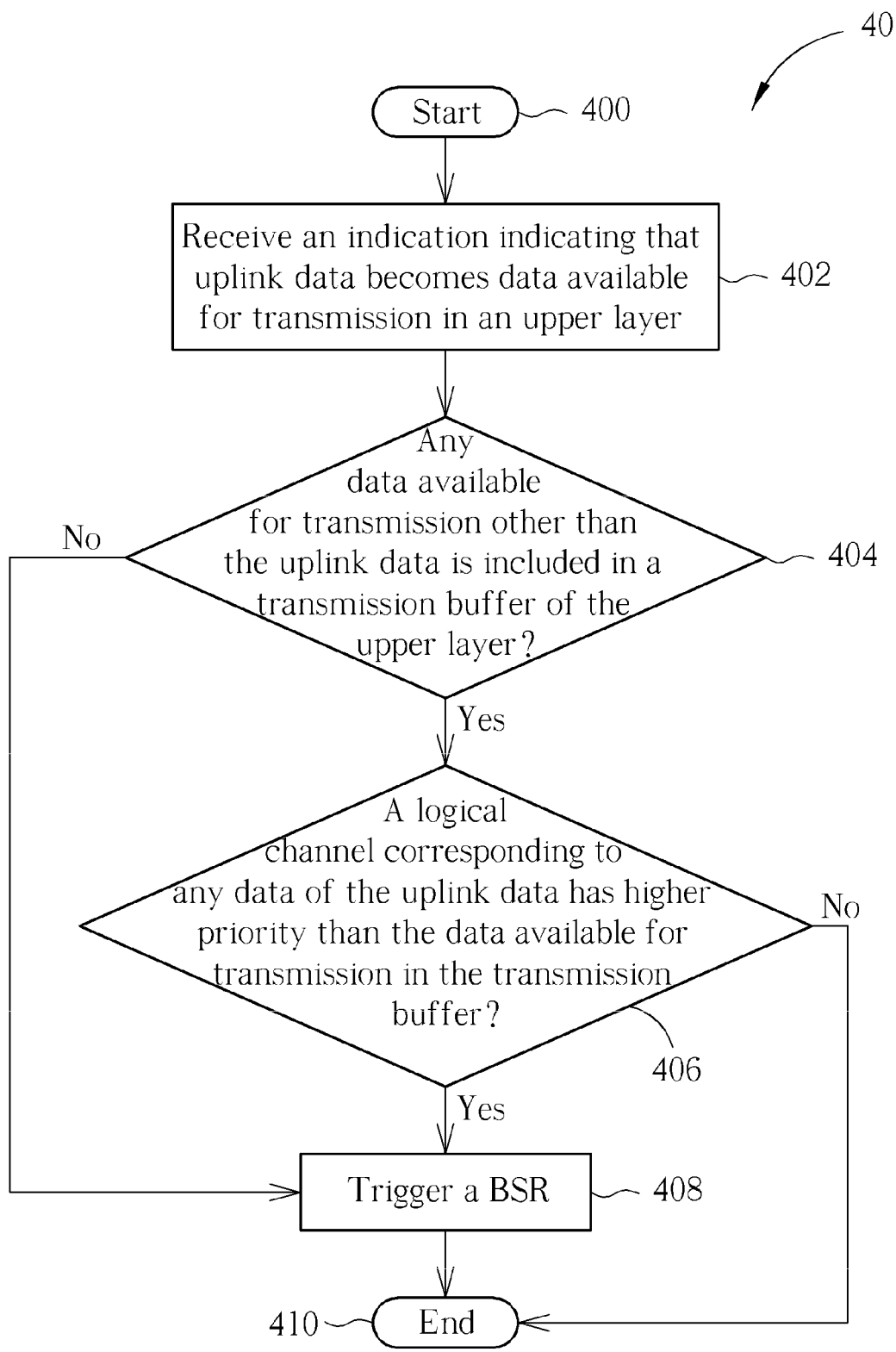
FIGS. 4-9 are flowcharts of processes according to embodiments of the present invention.

Please refer to FIG. 4, which illustrates a flowchart of a process 40 according to an embodiment of the present invention. The process 40 is utilized for improving a buffer status triggering mechanism for a MAC layer of a UE and can be compiled into BSR triggering program code 350 shown in FIG. 3. The process 40 includes the following steps:

Step 400: Start.

Step 402: Receive an indication indicating that uplink data becomes data available for transmission in an upper layer.

Step 404: Determine if any data available for transmission other than the uplink data is included in a transmission buffer of the upper layer or not. If so, perform Step 406; if not, perform Step 408.

Step 406: Determine if a logical channel corresponding to any data of the uplink data has higher priority than the data available for transmission in the transmission buffer or not. If so, perform Step 408; if not, perform Step 410.

Step 408: Trigger a BSR.

Step 410: End.

According to the process 40, when the UE is aware that the uplink data becomes available for transmission, the UE determines if any data available for transmission other than the uplink data is included in a transmission buffer or not. If the transmission buffer is empty or includes no other data available for transmission, the BSR is triggered. If there is other data available for transmission in the transmission buffer, the UE determines if a logical channel corresponding to any data of the uplink data has higher priority than the data available for transmission in the transmission buffer or not. When the logical channel has higher priority, the BSR is triggered, otherwise no BSR is triggered. Preferably, the BSR is a regular BSR. Thus, the process 40 ensures that a BSR is triggered when the UE has data available for transmission.

Preferably, the uplink data is new or retransmission data that is in RLC or PDCP layers or has been received by the MAC layer. In addition, the uplink data corresponds to a single logical channel or comes from multiple logical channels at a certain TTI (Transmission Time Interval). In this situation, the transmission buffer can be a buffer of an RLC or a PDCP transmission buffer.

As can be seen from the process 40, a regular BSR is triggered when the following two conditions are both met: (1) the UL data becomes available for transmission, and (2) when data of the UL data belongs to a logical channel with higher priority than those for which data available for transmission already existed in the transmission buffer if there is already data available for transmission other than the UL data in the UE transmission buffer.

The process 40 can improve the problem of the issue 1 in the prior art. When the RLC data PDU in the transmission buffer needs to be retransmitted, the RLC data PDU for retransmission becomes the above-defined data available for transmission, and then the UE determines if other data available for transmission in the transmission buffer or not. If the transmission buffer is empty or includes no other data available for transmission, the BSR for the retransmission of the RLC data PDU is triggered in order to request UL resources via the SR. On the contrary, if the transmission buffer includes other data available for transmission, the UE determines if logical channel priority of the RLC data PDU is higher than the data available for transmission or not. When the logical channel of the RLC data PDU has higher priority, the BSR is triggered, otherwise no BSR is triggered. Therefore, the retransmission of the RLC data PDU is not blocked when no UL resources are allocated.

The process 40 can improve the problem of the issue 2 in the prior art. After the failure of the MAC PDU related to the SDU of logical channel X and before expiration of the POLL RETRANSMIT TIMER, another UE RLC AM entity associated with a logical channel Y receives a SDU for transmission. According to the process 40, the SDU of logical channel X in the transmission buffer is not considered the data available for transmission. In this situation, the SDU of the logical channel Y is considered data available for transmission even the logical channel Y priority has lower priority than the logical channel X. As a result, the BSR is triggered and the uplink transmission for the SDU of the logical channel Y is not blocked.

For the process 40 applied to the situations where a handover or a RRC connection re-establishment occurs, at Step 404, the data available for transmission, already existed in the UE transmission buffer before occurrence of the handover or the RRC connection re-establishment, is determined as invisible data. In other words, the transmission buffer, which includes only the data available for transmission existing before occurrence of the handover or the RRC connection re-establishment, is considered an empty transmission buffer at Step 404.

In this situation, the process 40 can improve the problem of the issue 4 in the prior art. During the RRC connection re-establishment procedure, the PDCP buffer includes data of the DRB that has been transmitted by RLC before but has not been acknowledged or negatively acknowledged before the radio link failure. According to the process 40, the PDCP buffer is considered an empty buffer at Step 404 that is performed after the data of the RRC connection re-establishment complete message related to the SRB1 becomes data available for transmission. In this situation, the BSR for the RRC connection re-establishment complete message is triggered even though the logical channel priority of SRB1 is lower than or equal to the logical channel priority of the DRB. Thus, the RRC connection re-establishment procedure can be performed successfully.

Figure 5:
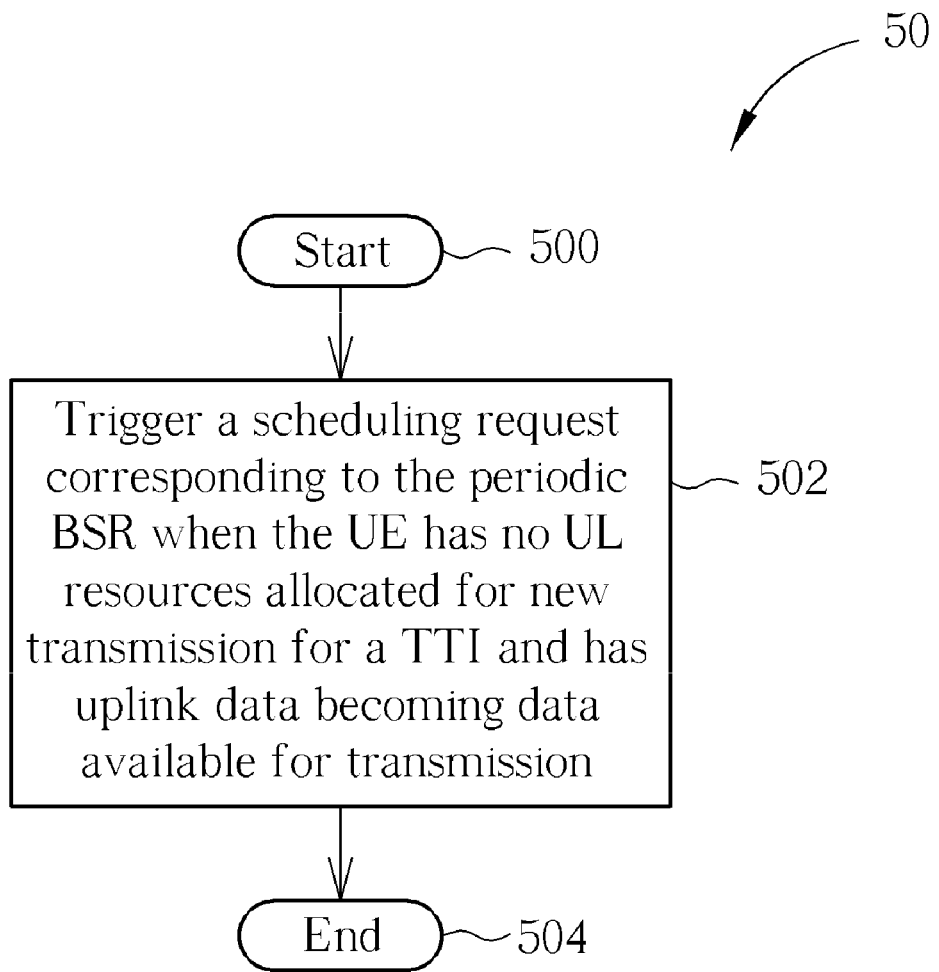

A periodic BSR timer is maintained in the UE and used for triggering the periodic BSR. When the periodic BSR timer expires, a periodic BSR is triggered, and then the periodic BSR timer is restarted. In this situation, a process is provided as bellow to ensure that the BSR is able to be triggered when no UL resources are allocated and there is data available for transmission. Please refer to FIG. 5, which illustrates a flowchart of a process 50 according to an embodiment of the present invention. The process 50 is utilized for improving a buffer status triggering mechanism for a UE triggering a periodic BSR and can be compiled into the BSR triggering program code 350. The process 50 includes the following steps:

Step 500: Start.

Step 502: Trigger a scheduling request corresponding to the periodic BSR when the UE has no UL resources allocated for new transmission for a TTI and has uplink data becoming data available for transmission.

Step 504: End.

According to the process 50 where the periodic BSR is triggered, the UE triggers the SR when having no UL resources allocated for new transmission for the TTI and there is uplink data becoming the data available for transmission defined as foregoing description. Thus, through the process 50, the SR can be triggered for requesting UL resources when the periodic BSR is triggered.

Preferably, the SR can be triggered not only when the UE has no UL resources allocated for new transmission for the TTI and has uplink data becoming the data available for transmission, but also when no MAC PDU, irrespective of including a BSR or not, is being retransmitted.

The process 50 can improve the problem of the issues 1 and 2 of the prior art. In the issues 1 and 2 of the prior art, the uplink transmissions are blocked since no regular BSR can be transmitted. However, the issues 1 and 2 are possibly applied with the periodic BSR. When the process 50 is applied to the issue 1, the SR can be triggered when the UE has no UL resources allocated for new transmission and the RLC data PDU for retransmission becomes the above-defined data available for transmission. On the other hand, when the process 50 is applied to the issue 2, the SR can be triggered when the UE has no UL resources allocated for new transmission and the SDU of the logical channel Y is considered data available for transmission.

Thus, the uplink transmissions related to the RLC data PDU for retransmission in the issue 1 and to the SDU of the logical channel Y are not blocked since the SR is triggered to request the eNB for UL resources.

In the prior art, only the regular BSR is able to trigger the SR. In the embodiment of the present invention, the SR can be triggered when the periodic BSR is triggered or the regular BSR is not triggered.

Figure 6:
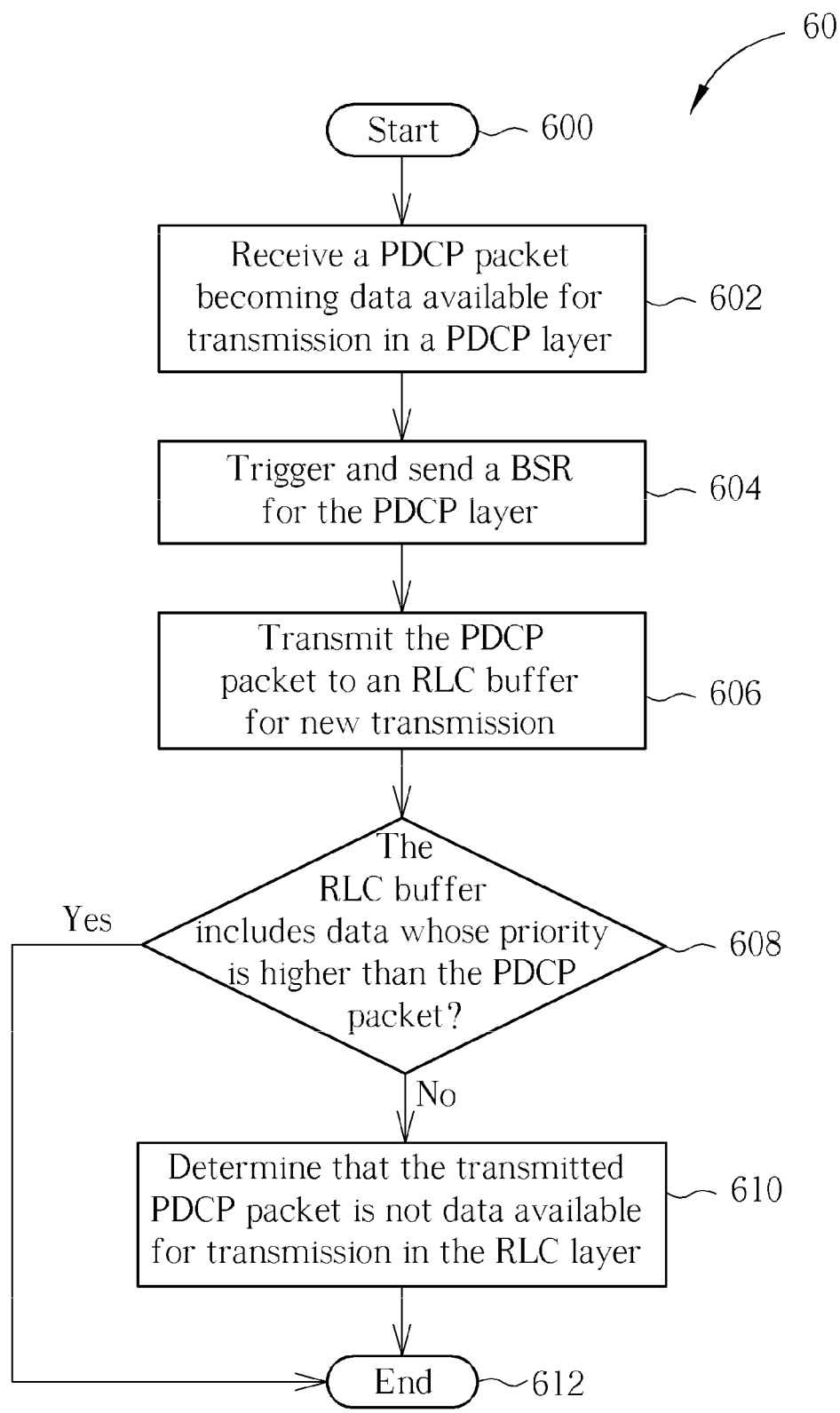

Please refer to FIG. 6, which illustrates a flowchart of a process 60 according to an embodiment of the present invention. The process 60 is utilized for improving a buffer status triggering mechanism for a UE and can be compiled into the BSR triggering program code 350. The process 60 includes the following steps:

Step 600: Start.

Step 602: Receive a PDCP packet becoming data available for transmission in a PDCP layer.

Step 604: Trigger and send a BSR for the PDCP layer.

Step 606: Transmit the PDCP packet to an RLC buffer for new transmission.

Step 608: Determine if the RLC buffer includes data whose priority is higher than the PDCP packet or not. If so, perform Step 612; if not, perform Step 610.

Step 610: Determine that the transmitted PDCP packet is not data available for transmission in the RLC layer.

Step 612: End.

According to the process 60, the PDCP packet becoming the data available for transmission is received in a PDCP layer, and thus the corresponding BSR is triggered. When the PDCP packet is transmitted to an RLC buffer for new transmission, the UE determines the state of the RLC buffer. When the RLC buffer does not include any data whose priority is higher than the PDCP packet, the transmitted PDCP packet is determined not to be the data available for transmission in the RLC layer. In other words, the transmitted PDCP packet is considered non-data available for transmission when the RLC buffer is empty or only includes data whose priority is lower than the PDCP packet. Therefore, the process 60 prevents the BSR related to the PDCP packet being triggered twice.

The process 60 can improve the problem of the issues 3 of the prior art. As having been known from the above, the PDCP buffer and the RLC buffer are both empty, and then the PDCP entity receives a PDCP SDU considered the data available for transmission. In this situation, the regular BSR for the PDCP layer is triggered and sent to the eNB. After header compression and ciphering of the PDCP SDU, the PDCP entity generates a PDCP PDU and submits the PDCP PDU to the RLC entity. According to the process 60, the PDCP PDU is considered non-data available for transmission in the RLC layer since the RLC buffer is empty. Thus, the BSR for the PDCP PDU is not triggered in the RLC layer. The BSR is not triggered twice.

Figure 7:
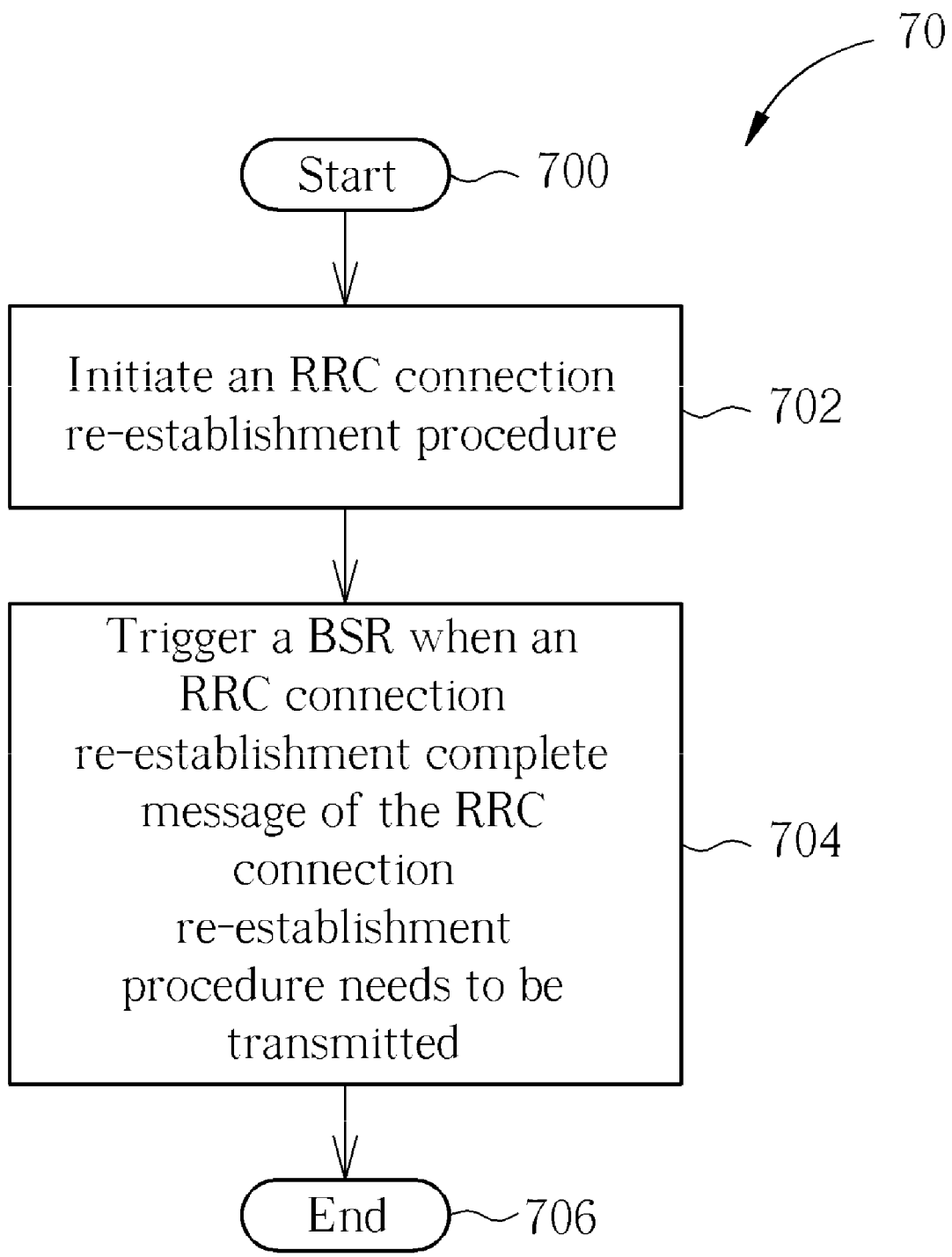

Please refer to FIG. 7, which illustrates a flowchart of a process 70 according to an embodiment of the present invention. The process 70 is utilized for improving a buffer status triggering mechanism for a UE and can be compiled into the BSR triggering program code 350. The process 70 includes the following steps:

Step 700: Start.

Step 702: Initiate an RRC connection re-establishment procedure.

Step 704: Trigger a BSR when an RRC connection re-establishment complete message of the RRC connection re-establishment procedure needs to be transmitted.

Step 706: End.

According to the process 70, after initiation of the RRC connection re-establishment procedure, a BSR is triggered when the UE needs to transmit the RRC connection re-establishment complete message. Moreover, the BSR is triggered when no enough UL resource is assigned to transmit the RRC connection re-establishment complete message. In the situation where no UL resource is assigned, the BSR is triggered to trigger a SR.

Through the process 70, uplink transmission related to the RRC connection re-establishment complete message is not blocked when no UL resources are assigned. Thus, failure of the RRC connection re-establishment procedure is avoided.

Preferably, the BSR is a regular BSR. The BSR only includes SRB1 data available for transmission.

The process 70 can improve the problem of the issue 4 of the prior art. When the RRC connection re-establishment complete message needs to be transmitted, the RRC connection re-establishment complete message is not considered the data available for transmission since the SRB1 has priority lower than or equal to the DRB. However, with the process 70, the regular BSR is still triggered to trigger the SR for UL resources.

Figure 8:
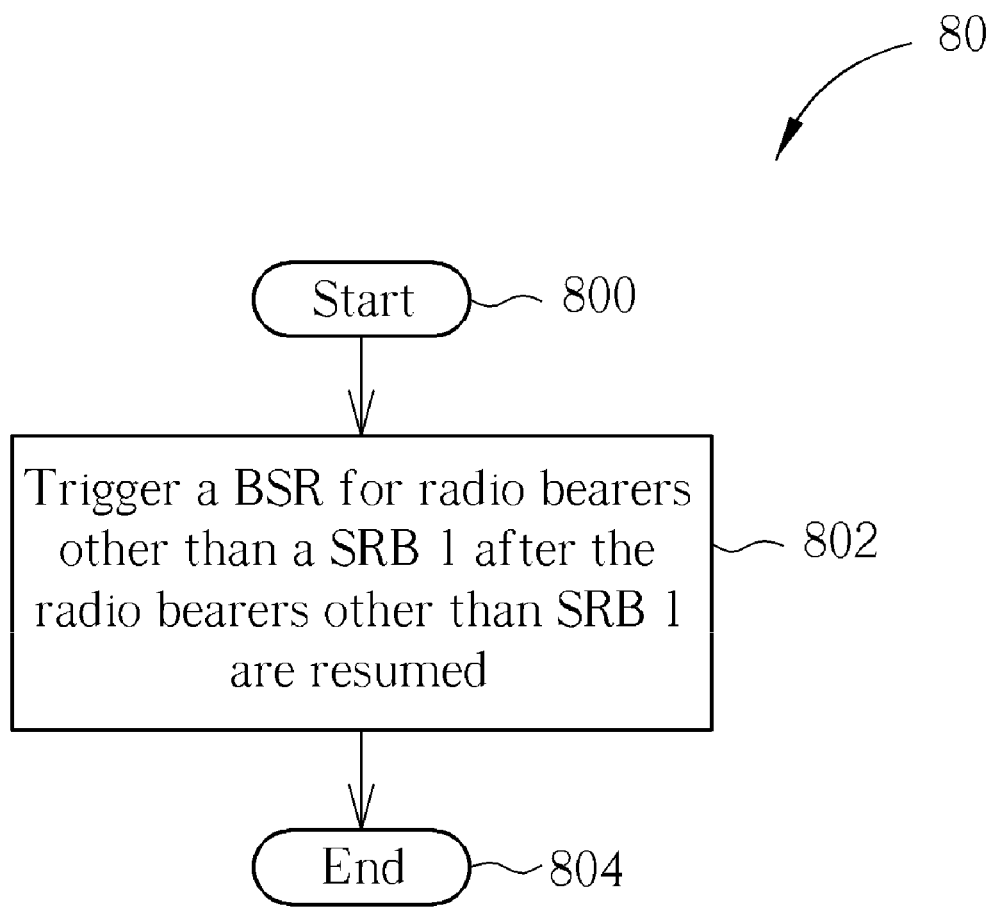

Please refer to FIG. 8, which illustrates a flowchart of a process 80 according to an embodiment of the present invention. The process 80 is utilized for improving a buffer status triggering mechanism for a UE and can be compiled into the BSR triggering program code 350. The process 80 includes the following steps:

Step 800: Start.

Step 802: Trigger a BSR for radio bearers other than a SRB 1 after the radio bearers other than SRB 1 are resumed.

Step 804: End.

According to the process 80, the BSR for radio bearers other than the SRB 1 is triggered after the radio bearers are resumed. Thus, the UL resources can be assigned for the radio bearers.

Preferably, the radio bearers other than the SRB 1 are resumed by an RRC connection reconfiguration message of an RRC connection reconfiguration procedure. The BSR is a regular BSR including data available for transmission in the radio bearers other than the SRB1.

Figure 9:
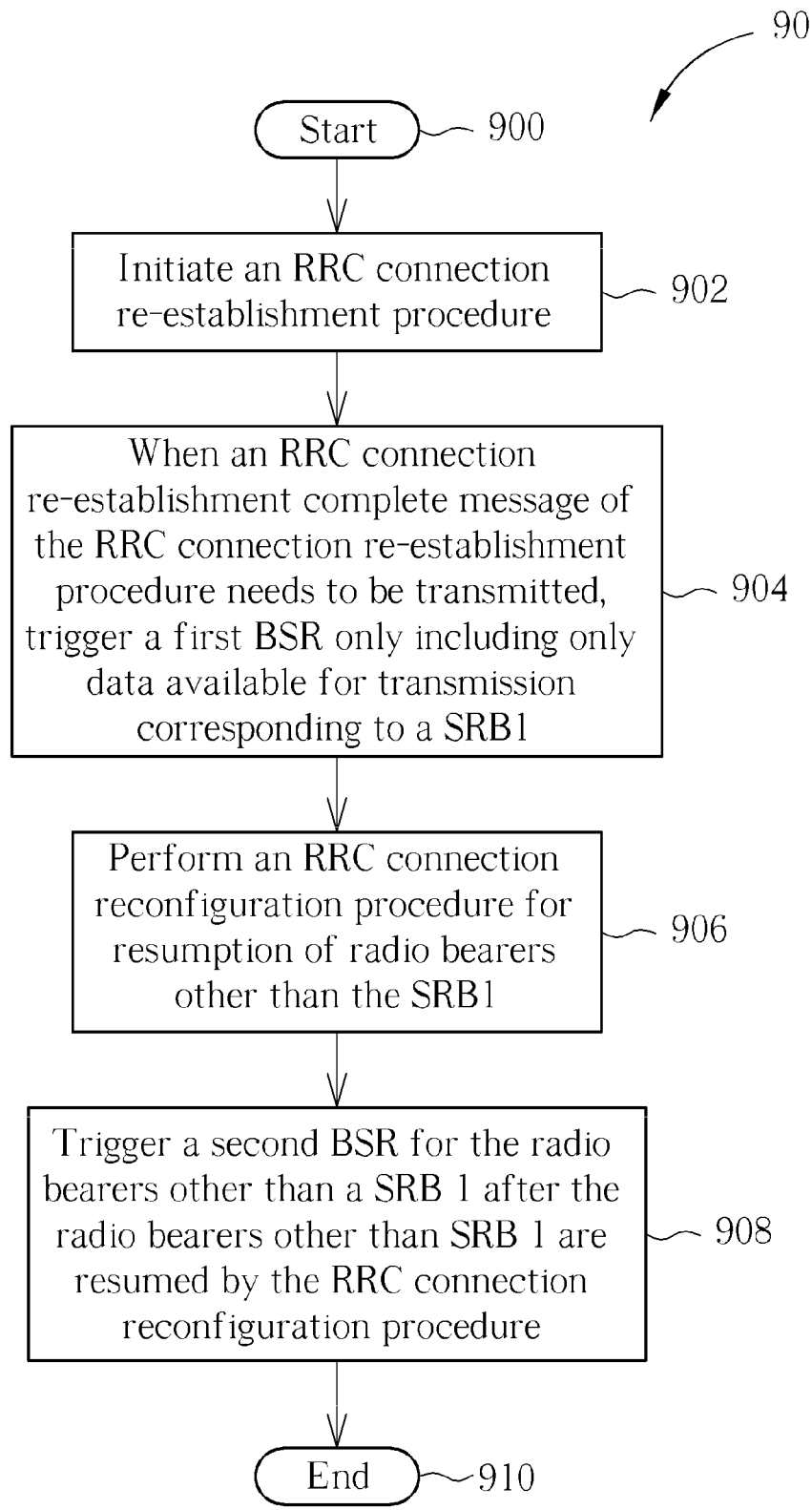

Please refer to FIG. 9, which illustrates a flowchart of a process 90 according to an embodiment of the present invention. The process 90 is utilized for improving a buffer status triggering mechanism for a UE and can be compiled into the BSR triggering program code 350. The process 90 includes the following steps:

Step 900: Start.

Step 902: Initiate an RRC connection re-establishment procedure.

Step 904: When an RRC connection re-establishment complete message of the RRC connection re-establishment procedure needs to be transmitted, trigger a first BSR only including only data available for transmission corresponding to a SRB1.

Step 906: Perform an RRC connection reconfiguration procedure for resumption of radio bearers other than the SRB1.

Step 908: Trigger a second BSR for the radio bearers other than a SRB 1 after the radio bearers other than SRB 1 are resumed by the RRC connection reconfiguration procedure.

Step 910: End.

As can be seen from the above, the process 90 is a combination of concepts of the processes 70 and 80, and thus detailed description thereof is omitted herein.

The process 90 can improve the problem of the issue 5 of the prior art. At RRC connection re-establishment triggered by a radio link failure, SRB 1 is resumed by an RRC connection re-establishment procedure, and other radio bearers, such as SRB2 and DRBs, can be resumed by a following RRC connection reconfiguration procedure. When the RRC connection re-establishment complete message needs to be transmitted, no radio bearers other than SRB 1 are resumed. In this situation, a first regular BSR only including data available for transmission for the SRB1 is triggered according to the process 90.

After the RRC connection reconfiguration procedure is performed, some of the radio bearers other than SRB1 are resumed, and some are released. In this situation, a second BSR for the radio bearers other than a SRB 1 is triggered. Thus, with the process 90, no redundant data available for transmission is included in the first regular BSR.

In conclusion, the embodiments of the present invention improve the BSR triggering mechanism to benefit performance of UL transmission and UL resource allocation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving a buffer status triggering mechanism of a communications layer for a mobile device of a wireless communication system, the method comprising:

receiving an indication indicating that uplink data becomes data available for transmission in an upper layer of the communications layer;

when data available for transmission other than the uplink data is included in a transmission buffer of the upper layer, determining whether a logical channel corresponding to any data of the uplink data has higher priority than logical channels corresponding to the data available for transmission in the transmission buffer;

when the logical channel corresponding to any data of the uplink data has higher priority than the logical channels corresponding to the data available for transmission in the transmission buffer, triggering a buffer status report; and when the uplink data is already available for transmission in the transmission buffer and is data that needs to be retransmitted, and when the transmission buffer includes no other data available for transmission, triggering a buffer status report.

2. The method of claim 1 further comprising:

determining whether any data available for transmission other than the uplink data is included in the transmission buffer of the upper layer; and when no data available for transmission other than the uplink data is included in the transmission buffer of the upper layer, triggering the buffer status report.

3. The method of claim 1 further comprising determining data available for transmission already included in the transmission buffer before a handover or a radio resource control connection re-establishment occurs as invisible data when the handover or the radio resource control connection re-establishment occurs.

4. The method of claim 1, wherein the communications layer is a medium access control layer, and the upper layer is a radio link control, hereinafter called RLC, layer or a packet data convergence protocol hereinafter called PDCP, layer.

5. The method of claim 4, wherein the data available for transmission for the RLC layer comprises at least one of:

RLC SDUs, known as service data units, that have not yet been included in an RLC data PDU, known as protocol data units, or are pending for retransmission;

segments of RLC SDUs that have not yet been included in an RLC data PDU or are pending for retransmission; and a STATUS PDU arranged to be transmitted in next transmission opportunity when the STATUS PDU has been triggered and a status prohibit timer is not running or has expired; and the data available for transmission for the PDCP layer comprises at least one of:

PDCP control PDUs;

PDCP SDUs, known as service data units, for which no PDCP PDU, known as protocol data units, has been submitted to the RLC layer; and when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report.

6. The method of claim 1 further comprising:

triggering a scheduling request corresponding to the buffer status report when the mobile device has no uplink resources allocated for a new transmission and has uplink data becoming data available for transmission.

7. The method of claim 6, wherein the buffer status report is a periodic buffer status report.

8. The method of claim 6, wherein the data available for transmission comprises at least one of:
   RLC SDUs, known as radio link control service data units, that have not yet been included in an RLC data PDU, known as protocol data units, or are pending for retransmission;
   segments of RLC SDUs that have not yet been included in an RLC data PDU or are pending for retransmission;
   a STATUS PDU arranged to be transmitted in next transmission opportunity when the STATUS PDU has been triggered and a status prohibit timer is not running or has expired;
   PDCP control PDUs;
   PDCP SDUs, known as packet data convergence protocol service data units, for which no PDCP PDU, known as protocol data units, has been submitted to the RLC layer; and
   when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report.

9. The method of claim 6, wherein triggering the scheduling request corresponding to the buffer status report when the mobile device has no uplink resources allocated for the new transmission and has uplink data becoming data available for transmission is triggering the scheduling request corresponding to the buffer status report when the mobile device has no uplink resources allocated for the new transmission, has no medium access control packet retransmitted, and has uplink data becoming data available for transmission.

10. A communication device of a wireless communication system for improving a buffer status triggering mechanism of a communications layer, the communication device comprising:
   a computer readable recording medium for storing program code corresponding to a process;
   a processor coupled to the computer readable recording medium, for processing the program code to execute the process;
   wherein the process comprises:
      receiving an indication indicating that uplink data becomes data available for transmission in an upper layer of the communications layer;
      when data available for transmission other than the uplink data is included in a transmission buffer of the upper layer, determining whether a logical channel corresponding to any data of the uplink data has higher priority than logical channels corresponding to the data available for transmission in the transmission buffer;
      when the logical channel corresponding to any data of the uplink data has higher priority than the logical channels corresponding to the data available for transmission in the transmission buffer, triggering a buffer status report; and
      when the uplink data is already available for transmission in the transmission buffer and is data that needs to be retransmitted, and when the transmission buffer includes no other data available for transmission, triggering a buffer status report.

11. The communication device of claim 10, wherein the process further comprises:
   determining whether any data available for transmission other than the uplink data is included in the transmission buffer of the upper layer; and
   when no data available for transmission other than the uplink data is included in the transmission buffer of the upper layer, triggering the buffer status report.

12. The communication device of claim 10, wherein the process further comprises determining data available for transmission already included in the transmission buffer before a handover or a radio resource control connection re-establishment occurs as invisible data when the handover or the radio resource control connection re-establishment occurs.

13. The communication device of claim 10, wherein the communications layer is a medium access control layer, and the upper layer is a radio link control, hereinafter called RLC, layer or a packet data convergence protocol hereinafter called PDCP, layer.

14. The communication device of claim 13, wherein the data available for transmission for the RLC layer comprises at least one of:
   RLC SDUs, known as service data units, that have not yet been included in an RLC data PDU, known as protocol data units, or are pending for retransmission;
   segments of RLC SDUs that have not yet been included in an RLC data PDU or are pending for retransmission; and
   a STATUS PDU arranged to be transmitted in next transmission opportunity when the STATUS PDU has been triggered and a status prohibit timer is not running or has expired; and
   the data available for transmission for the PDCP layer comprises at least one of:
   PDCP control PDUs;
   PDCP SDUs, known as service data units, for which no PDCP PDU, known as protocol data units, has been submitted to the RLC layer; and
   when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report.

15. The communication device of claim 10, wherein the process further comprises:
   triggering a scheduling request corresponding to the buffer status report when the communication device has no uplink resources allocated for a new transmission and has uplink data becoming data available for transmission.

16. The communication device of claim 15, wherein the buffer status report is a periodic buffer status report.

17. The communication device of claim 15, wherein the data available for transmission comprises at least one of:
   RLC SDUs, known as radio link control service data units, that have not yet been included in an RLC data PDU, known as protocol data units, or are pending for retransmission;
   segments of RLC SDUs that have not yet been included in an RLC data PDU or are pending for retransmission;
   a STATUS PDU arranged to be transmitted in next transmission opportunity when the STATUS PDU has been triggered and a status prohibit timer is not running or has expired;

PDCP control PDUs;
PDCP SDUs, known as packet data convergence protocol service data units, for which no PDCP PDU, known as protocol data units, has been submitted to the RLC layer; and
when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report.

18. The communication device of claim 15, wherein triggering the scheduling request corresponding to the buffer status report when the communication device has no uplink resources allocated for the new transmission and has uplink data becoming data available for transmission is triggering the scheduling request corresponding to the buffer status report when the mobile device has no uplink resources allocated for the new transmission, has no medium access control packet retransmitted, and has uplink data becoming data available for transmission.

19. A method for improving a buffer status triggering mechanism for a mobile device of a wireless communication system, the method comprising:
triggering a buffer status report corresponding to a packet of a first communications layer when the packet of the first communications layer becomes data available for transmission in the first communications layer;
when the packet of the first communications layer is transmitted to a second communications layer, determining whether a buffer of the second communications layer includes data whose priority is higher than the packet of the first communications layer; and
when the buffer of the second communications layer does not include any data whose priority is higher than the packet of the first communications layer, determining that the packet of the first communications layer is not data available for transmission in the second communications layer.

20. The method of claim 19, wherein the first communications layer is a packet data convergence protocol hereinafter called PDCP, layer, and the second communications layer is a radio link control, hereinafter called RLC, layer.

21. The method of claim 20, wherein the data available for transmission in the PDCP layer comprises at least one of:
PDCP SDUs, known as service data units, for which no PDCP PDU, known as protocol data units, has been submitted to the RLC layer; and
when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report; and
the data available for transmission in the RLC layer comprises at least one of:
RLC SDUs, known as service data units, that have not yet been included in an RLC data PDU, known as protocol data units, or are pending for retransmission;
segments of RLC SDUs that have not yet been included in an RLC data PDU or are pending for retransmission; and
a STATUS PDU arranged to be transmitted in next transmission opportunity when the STATUS PDU has been triggered and a status prohibit timer is not running or has expired.

22. A communication device of a wireless communication system for improving a buffer status triggering mechanism, the communication device comprising:
a computer readable recording medium for storing program code corresponding to a process;
a processor coupled to the computer readable recording medium, for processing the program code to execute the process;
wherein the process comprises:
triggering a buffer status report corresponding to a packet of a first communications layer when the packet of the first communications layer becomes data available for transmission in the first communications layer;
when the packet of the first communications layer is transmitted to a second communications layer, determining whether a buffer of the second communications layer includes data whose priority is higher than the packet of the first communications layer; and
when the buffer of the second communications layer does not include any data whose priority is higher than the packet of the first communications layer, determining that the packet of the first communications layer is not data available for transmission in the second communications layer.

23. The communication device of claim 22, wherein the first communications layer is a packet data convergence protocol hereinafter called PDCP, layer, and the second communications layer is a radio link control, hereinafter called RLC, layer.

24. The communication device of claim 23, wherein the data available for transmission in the PDCP layer comprises at least one of:
PDCP SDUs, known as service data units, for which no PDCP PDU, known as protocol data units, has been submitted to the RLC layer; and
when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report; and
the data available for transmission in the RLC layer comprises at least one of:
RLC SDUs, known as service data units, that have not yet been included in an RLC data PDU, known as protocol data units, or are pending for retransmission;
segments of RLC SDUs that have not yet been included in an RLC data PDU or are pending for retransmission; and
a STATUS PDU arranged to be transmitted in next transmission opportunity when the STATUS PDU has been triggered and a status prohibit timer is not running or has expired.

25. A method for improving a buffer status triggering mechanism for a mobile device of a wireless communication system, the method comprising:
initiating a radio resource control, hereinafter called RRC, connection re-establishment procedure; and
when an RRC connection re-establishment complete message of the RRC connection re-establishment procedure needs to be transmitted, triggering a buffer status report corresponding to the RRC connection re-establishment complete message, wherein the buffer status report corresponding to the RRC connection re-establishment complete message only comprises data available for transmission corresponding to a signaling radio bearer 1, known as SRB1.

26. The method of claim 25, wherein the data available for transmission comprises at least one of:
RLC SDUs, known as radio link control service data units, that have not yet been included in an RLC data PDU, known as protocol data units, or are pending for retransmission;
segments of RLC SDUs that have not yet been included in an RLC data PDU or are pending for retransmission;
a STATUS PDU arranged to be transmitted in next transmission opportunity when the STATUS PDU has been triggered and a status prohibit timer is not running or has expired;
PDCP control PDUs;
PDCP SDUs, known as packet data convergence protocol service data units, for which no PDCP PDU, known as protocol data units, has been submitted to the RLC layer; and
when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report.

27. The method of claim 25, wherein triggering the buffer status report when the RRC connection re-establishment complete message needs to be transmitted is triggering the buffer status report when the RRC connection re-establishment complete message needs to be transmitted and no uplink resources corresponding to the RRC connection re-establishment complete message is allocated.

28. The method of claim 27 further comprising triggering a scheduling request by the buffer status report.

29. The method of claim 25 further comprising:
triggering a buffer status report for radio bearers other than a signaling radio bearer 1 after the radio bearers other than the signaling radio bearer 1 are resumed.

30. The method of claim 29, wherein the radio bearers other than the signaling radio bearer 1 are resumed by a radio resource control connection reconfiguration procedure.

31. The method of claim 29, wherein the buffer status report comprises data available for transmission corresponding to the radio bearers other than the signaling radio bearer 1, and the data available for transmission comprises at least one of:
RLC SDUs, known as radio link control service data units, that have not yet been included in an RLC data PDU, known as protocol data units, or are pending for retransmission;
segments of RLC SDUs that have not yet been included in an RLC data PDU or are pending for retransmission;
a STATUS PDU arranged to be transmitted in next transmission opportunity when the STATUS PDU has been triggered for the SRB1 and a status prohibit timer is not running or has expired;
PDCP SDUs, known as packet data convergence protocol service data units, for which no PDCP PDU, known as protocol data units, has been submitted to the RLC layer; and
when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report.

32. A communication device of a wireless communication system for improving a buffer status triggering mechanism, the communication device comprising:
a computer readable recording medium for storing program code corresponding to a process;
a processor coupled to the computer readable recording medium, for processing the storage data to execute the process;
wherein the process comprises:
initiating an radio resource control, hereinafter called RRC, connection re-establishment procedure; and
when an RRC connection re-establishment complete message of the RRC connection re-establishment procedure needs to be transmitted, triggering a buffer status report corresponding to the RRC connection re-establishment complete message, wherein the buffer status report corresponding to the RRC connection re-establishment complete message only comprises data available for transmission corresponding to a signaling radio bearer 1, known as SRB1.

33. The communication device of claim 32, wherein the data available for transmission comprises at least one of:
RLC SDUs, known as radio link control service data units, that have not yet been included in an RLC data PDU, known as protocol data units, or are pending for retransmission;
segments of RLC SDUs that have not yet been included in an RLC data PDU or are pending for retransmission;
a STATUS PDU arranged to be transmitted in next transmission opportunity when the STATUS PDU has been triggered and a status prohibit timer is not running or has expired;
PDCP control PDUs;
PDCP SDUs, known as packet data convergence protocol service data units, for which no PDCP PDU, known as protocol data units, has been submitted to the RLC layer; and
when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report.

34. The communication device of claim 32, wherein triggering the buffer status report when the RRC connection re-establishment complete message needs to be transmitted is triggering the buffer status report when the RRC connection re-establishment complete message needs to be transmitted and no uplink resources corresponding to the RRC connection re-establishment complete message is allocated.

35. The communication device of claim 34 further comprising triggering a scheduling request by the buffer status report.

36. The communication device of claim 32,
wherein the process further comprises:
triggering a buffer status report for radio bearers other than a signaling radio bearer 1 after the radio bearers other than the signaling radio bearer 1 are resumed.

37. The communication device of claim 36, wherein the radio bearers other than the signaling radio bearer 1 are resumed by a radio resource control connection reconfiguration procedure.

38. The communication device of claim 36, wherein the buffer status report comprises data available for transmission corresponding to the radio bearers other than the signaling radio bearer 1, and the data available for transmission comprises at least one of:

RLC SDUs, known as radio link control service data units, that have not yet been included in an RLC data PDU, known as protocol data units, or are pending for retransmission;

segments of RLC SDUs that have not yet been included in an RLC data PDU or are pending for retransmission;

a STATUS PDU arranged to be transmitted in next transmission opportunity when the STATUS PDU has been triggered for the SRB1 and a status prohibit timer is not running or has expired;

PDCP SDUs, known as packet data convergence protocol service data units, for which no PDCP PDU, known as protocol data units, has been submitted to the RLC layer; and when an indication indicating that a handover or a RRC (Radio Resource Control) connection re-establishment has occurred is received, PDCP SDUs for which a corresponding PDCP PDU has only been submitted to the RLC layer before the indication is received, and for which a successful delivery has not been confirmed by the RLC or MAC layer or by a PDCP status report.

* * * * *